UNITED STATES PATENT OFFICE.

EDWARD W. HASLUP, OF BRONXVILLE, NEW YORK, ASSIGNOR TO HASLUP & PEACOCK, INC., OF NEW YORK, N. Y., A CORPORATION OF NEW YORK.

PROCESS OF PRODUCING MANGANESE SULFATE.

1,279,110.

Specification of Letters Patent. Patented Sept. 17, 1918.

No Drawing. Application filed February 2, 1918. Serial No. 215,198.

*To all whom it may concern:*

Be it known that I, EDWARD W. HASLUP, a citizen of the United States, residing at Bronxville, in the county of Westchester and State of New York, have invented certain new and useful Improvements in Processes of Producing Manganese Sulfate; and I do hereby declare the following to be a full, clear, and exact description of the invention, such as will enable others skilled in the art to which it appertains to make and use the same.

This invention relates to a process of recovering manganese sulfate from low grade manganese ores, or from waste products of metallurgical processes containing manganese, and has for its object to improve the procedures heretofore proposed.

With this and other objects in view the invention consists in the novel steps and combinations of steps constituting the process, all as will be more fully hereinafter disclosed and particularly pointed out in the claims.

In carrying out this process, I may take a low grade of manganese ore, or a waste product from a metallurgical process containing say from 8% to 20% of manganese oxids, finely divide the same and digest it at, or slightly above say 60° C., in a solution of ferric or ferrous sulfate, or in a solution of aluminum, chromium, or manganic sulfate $Mn(SO_4)_2$. The manganese in the ore or waste product is then converted into a manganese sulfate with an efficiency greater than would be the case if a temperature substantially different from 60° C. were employed.

That is to say, I have found that if this temperature is departed from very materially, the amount of manganese sulfate produced will be lessened. The manganese sulfate thus produced may be recovered in any suitable manner, as by drawing off the solution, filtering the same, and evaporating to the point of crystallization. Or said sulfate may be precipitated by means of alkali metal hyrates, or by means of magnesium hydroxid.

This process is especially applicable to manganiferous slags, or residues, and to low grade tailings from manganese concentration processes.

I have found that a crude ferric sulfate obtained from the treatment of New Jersey green sand with sulfuric acid as desirable to employ in this process, not only on account of its low first cost, but also on account of its efficiency. Said crude ferric sulfate contains ordinarily about 20% of its weight of aluminum sulfate, together with certain impurities, and it is possible that said impurities act catalytically with the mixed ferric and aluminum sulfates to produce satisfactory results.

Whatever may be the real explanation, said crude mixed sulfates of aluminum and iron are found to be so cheap and efficient as to enable the above described process to be commercially feasible on ores that are too low in manganese for commercial success when other and more expensive reagents are employed.

What I claim is:—

1. The process of extracting combined manganese from low grade material containing oxids of manganese which consists in finely dividing said material; digesting said finely divided material at a temperature of substantially 60° C. in a solution of a metal sulfate capable of attacking the manganese oxids present; separating out the crude solution of manganese sulfates thus produced; and recovering said sulfates, substantially as described.

2. The process of extracting combined manganese from low grade material containing manganese oxids which consists in finely dividing said material; digesting said finely divided material at a temperaure of substantially 60° C. in a solution containing ferrous sulfate to form a sulfate of manganese; and recovering said last named sulfate from the solution, substantially as described.

3. The process of extracting combined manganese from low grade material containing manganese oxids which consists in finely dividing said material; digesting said finely divided material at a temperature of substantially 60° C. in a solution containing ferrous sulfate and aluminum sulfate to form a sulfate of manganese; and recovering said last named sulfate from the solution, substantially as described.

4. The process of extracting combined manganese from low grade material containing manganese oxids, which consists in finely dividing said material; digesting said finely divided material at a temperature of substantially 60° C. in a solution containing ferrous sulfate and aluminum sulfate derived from green sand to form a sulfate of manganese; and recovering said last named sulfate from the solution, substantially as described.

In testimony whereof I affix my signature, in presence of two witnesses.

EDWARD W. HASLUP.

Witnesses:
　M. C. WALSH,
　M. L. FETTER.